Patented Dec. 19, 1939

2,183,589

UNITED STATES PATENT OFFICE 2,183,589

DERIVATIVES OF COMPOUNDS OF THE SUPRARENAL CORTICAL HORMONE SERIES AND PROCESS OF MAKING SAME

Tadeus Reichstein, Zurich, and Emil Schlittler, Basel, Switzerland, assignors, by mesne assignments, to the firm Roche-Organon Incorporated, Nutley, N. J.

No Drawing. Application December 20, 1937, Serial No. 180,918. In Switzerland December 23, 1936

16 Claims. (Cl. 260—397)

It has been found that compounds of the suprarenal cortical hormone series can be obtained by treating suprarenal cortical hormones or preparations containing the same with agents suitable for converting a hydroxyl group into such a group which is reconvertible into a hydroxyl group by a hydrolizing agent. This is for example possible by treatment with esterifying and etherifying agents. The compounds thus obtained may be purified, if necessary.

The esterification can be carried out in known manner by using for example acids, their anhydrides, halides, esters or also ketenes. Acid components suitable for the esterification are saturated or unsaturated, straight-chain or branched-chain acids, like acetic acid, chloroacetic acid, propionic acid, butyric acid, isovaleric acid, succinic acid, palmitic acid, crotonic acid, aromatic or fatty aromatic acids, for example benzoic acid, phenyl acetic acid or also phosphoric acid, chlorosulfonic acid, further derivatives of carbonic acid, for example carbamic acid and mono-alkoxy carbonic acids. Compounds reconvertible into a hydroxyl group are, for example, also halogen, amine and the like. The etherification is carried out according to known methods, for example by introducing saturated or unsaturated aryl, aralkyl or alkyl radicals. Particularly there are used reactive compounds, for example triarylmethylhalides such as trityl chloride, further diphenyl halogen methanes, nitrobenzyl halides, picryl chloride or the corresponding aryl sulfonic esters and the like. The esterification and the etherification are effected if desired in the presence of condensing agents, for example tertiary bases such as pyridine, dimethylaniline, trialkylamines, further alkali carbonates and the like. In this esterification or etherification the 21-hydroxyl group enters always into reaction. When using more energetic conditions it is also possible to obtain derivatives of further hydroxyl or of keto groups (in the form of their enols).

The present process serves both for the manufacture of derivatives of any desired compounds having the effect of the suprarenal cortical hormones and also for the concentration and purification of preparations containing such compounds, for example of more or less purified extracts or of substances and mixtures of substances obtained by synthesis. The compounds having the biological activity of the suprarenal cortical hormones are characterized by an α-ketol-grouping in 17-position of the cyclopentano-polyhydro-phenanthrene skeleton. Particular mention is made of the following compounds:

$\Delta^4$-21-hydroxy-pregnene-dione-(3,20)
$\Delta^4$-11:21-dihydroxy-pregnene-dione-(3,20)
$\Delta^4$-11-keto-21-hydroxy-pregnene-dione-(3,20)
$\Delta^4$-17:21-dihydroxy-pregnene-dione-(3,20)
$\Delta^4$-11:17;21-trihydroxy-pregnene-dione-(3,20)
$\Delta^4$-11-keto-17:21-dihydroxy-pregnene-dione-(3,20).

The new derivatives of the suprarenal cortical hormones are to be used as therapeutics. They have interesting pharmacological properties. By suitable selection of the acid or ether radical it is possible to produce compounds having a more or less protracted effect and being more or less soluble in water or lipoids.

The following examples illustrate the invention, the parts being by weight:

Example 1

1 part of corticosterone in 5 parts of pyridine is mixed with 2 parts of acetic acid anhydride and allowed to stand at room temperature for some time. The mixture is evaporated to dryness in a vacuum and the residue is suspended in little water. The separated crude product is filtered and washed with water. The dried crystalline product is recrystalized from acetone and ether; it shows a double melting point at 145° C. and 153° C.

The same corticosterone-acetate is also obtained by the action of ketene, acetylhalides and the like on corticosterone.

Example 2

1 part of cortical hormone (corticosterone) is taken up in 20 parts of absolute pyridine, the solution is mixed with 5 parts of butyryl chloride while cooling and allowed to stand for some time. The reaction mixture is then poured into water, allowed to stand for some time, and then filtered. After recrystallization of the butyrate from ether the product has a melting point of 170° C.

Instead of butyryl chloride there may be used the corresponding anhydride. Other suitable acids are for example propionic acid, butyric acids, crotonic acid, valeric acids, caproic acid, oenanthic acid, caprylic acid, pelargonic acid, capric acid, lauric acid, myristic acid, stearic acid, and the like. As diluents there may be used ether, benzene, toluene, chloroform and the like. Besides pyridine there may be used as acid absorbing agents: tertiary bases such as dimethylaniline, quinoline, trialkylamines or alkali carbonates and the like.

Example 3

1 part of corticosterone in 5 parts of pyridine is mixed with 1½ parts of palmitic acid chloride. After working up in the usual manner, purifying and recrystallizing, the palmitate thus obtained melts at about 90° C.

Example 4

1 part of corticosterone is dissolved in 20 parts of methyl butyrate, 0.1 part of anhydrous sodium butyrate and a trace of potash are added to this solution and the whole is refluxed. As soon as the calculated quantity of methyl alcohol is split off, the mixture is evaporated in a vacuum and the residue treated with water. It is then filtered and the dried product is recrystallized from ether, the melting point is then 170° C.

As further suitable acids there may inter alia be used the acids named in Example 2, also the alcoholic groups can be varied, so that a re-esterification can for example also be carried out with phenyl valerate.

Example 5

1 part of corticosterone is dissolved in 5 parts of pyridine and the solution is mixed with 1 part of benzoyl chloride in 15 parts of absolute ether. After some hours the ether is evaporated at gentle heat and the residue worked up according to Example 1. The recrystallized product has a melting point of 201° C.

Example 6

A mixture of 1 part of corticosterone, 5 parts of pyridine and 1½ parts of succinic anhydride is allowed to stand for 24 hours. It is then diluted with ether and the ethereal solution after filtering is extracted with small quantities of dilute sodium carbonate solution. The acid succinic ester is precipitated by addition of acid, the precipitate is filtered, washed with little water and dried. The ester recrystallized from ether melts at 194° C.

In similar manner there may also be used other acylating compounds which in addition to the group that effects the acylation contain a group adapted for salt formation or a group convertible thereto, such as for example phthalic anhydride, chlorsulfonic acid, chloroacetic acid, bromopropionic acid, nitrobenzoic acid, and the like.

Example 7

1 part of desoxy-corticosterone is dissolved in little acetone and while cooling well there are introduced 4–5 mols of gaseous ketene per 1 mol of desoxy-corticosterone. The whole is worked up according to Example 1 and there is thus obtained desoxy-corticosterone acetate of melting point 157–159° C.

Likewise there are also obtained other esters and ethers of the desoxy-corticosterone, as are mentioned for example in the introduction of this specification.

In similar manner there are also obtained the esters and ethers for example of the 17-oxy-corticosterone, for instance the 17-oxy-corticosterone-acetate of melting point 223–225° C.

Example 8

1 part of an oily suprarenal cortical hormone concentrate is dissolved in 20 parts of pyridine. To this solution there are added 2½ parts of trityl chloride and the whole is heated for 2 hours to 70–80° C. The pyridine is then completely removed in a vacuum. The residue is repeatedly kneaded with petrol ether and then distributed between alcohol of about 70 per cent. strength and petrol ether. The alcoholic phase is evaporated to dryness in a vacuum, made into a paste with little water, and repeatedly extracted with much ether. The nearly colorless ether solution is dried over sodium sulfate and evaporated in a vacuum. The trityl compound of the suprarenal cortical hormones now crystallizes. For preparing the free hormones the trityl compound is carefully decomposed with mineral acid or acetic acid.

In similar manner there is obtained for example the dinitrobenzyl ether of the suprarenal cortical hormones by the action of dinitrobenzyl chloride on the hormone concentrate in anhydrous triethylamine.

Example 9

2 parts of corticosterone are dissolved in 20 parts of absolute pyridine, the solution is well cooled in ice and 1 part of phosphorus oxychloride is carefully added thereto. The whole is allowed to stand for about 2 hours in ice and 20 hours at room temperautre, whereupon the solution is poured into ice water, filtered, and the mono-phosphorus ester of the suprarenal cortical hormone is precipitated by acidifying the solution. The said ester is washed with some ice water and dried in a vacuum. Its alkali salts as well as the ammonium salt, the triethanolamine salt and other salts are soluble in water. With regard to the term "corticosterone" used herein to designate the starting material used, reference is made to the publication of T. Reichstein, E. Laqueur, I. E. Uyldert, P. de Fremery and R. W. Spanhoff in "Koninklijke Akademie van Wetenschappen te Amsterdam Proceedings", vol. 39, No. 10, 1936, and of P. de Fremery and collaborators in "Nature", 139, 26 (1937) and T. Reichstein in "Helvetica Chimica Acta", 20, 953 (1937). See also Harry Sobotka, "The Chemistry of the Sterids", Baltimore, 1938, page 105.

What we claim is:

1. Process for producing and purifying compounds of the suprarenal cortical hormone series, comprising treating a compound of the group of suprarenal cortical hormones and preparations containing the same with an agent capable of converting a hydroxyl group into a group which is reconvertible to a hydroxyl group by a hydrolizing agent.

2. Process for producing and purifying compounds of the suprarenal cortical hormone series, comprising treating a compound of the group of suprarenal cortical hormones and preparations containing the same with an agent capable of converting a hydroxyl group into a group which is reconvertible to a hydroxyl group by a hydrolizing agent, and purifying the compounds thus obtained.

3. A process as claimed in claim 2, wherein the compounds thus obtained are split by the action of saponifying agents.

4. Process for the manufacture of esters of the suprarenal cortical hormone series, comprising treating a compound of the suprarenal cortical hormone series with an esterifying agent.

5. Process for the manufacture of acyl derivatives of the suprarenal cortical hormone series, comprising treating a compound of the suprarenal cortical hormone series with an acylating agent.

6. Process for the manufacture of acyl derivatives of Δ⁴-3,20-diketo-21-hydroxy-pregnenes, comprising treating a Δ⁴-3,20-diketo-21-hydroxy-pregnene with an acylating agent.

7. The suprarenal cortical hormones containing at least one group which is convertible to a hydroxyl group by a hydrolizing agent.

8. The esters of the suprarenal cortical hormone series.

9. The acyl derivatives of the suprarenal cortical hormone series.

10. The acyl derivatives of Δ⁴-3,20-diketo-21-hydroxy-pregnenes.

11. The aliphatic acyl derivatives of Δ⁴-3,20-diketo-21-hydroxy-pregnenes.

12. The acetate of Δ⁴-3,20-diketo-21-hydroxy-pregnene having the melting point of 157–159° C.

13. The esters of corticosterone.

14. The acyl esters of corticosterone.

15. The aliphatic acyl esters of corticosterone.

16. The acetate of corticosterone.

TADEUS REICHSTEIN.
EMIL SCHLITTLER.